H. F. HUTTON.
GRAIN SAVER FOR THRESHING MACHINES.
APPLICATION FILED APR. 3, 1916.

1,197,293.

Patented Sept. 5, 1916.
6 SHEETS—SHEET 1.

WITNESS
J H Swan

INVENTOR
HOMER F. HUTTON
BY James A Walsh
ATTORNEY

H. F. HUTTON.
GRAIN SAVER FOR THRESHING MACHINES.
APPLICATION FILED APR. 3, 1916.

1,197,293.

Patented Sept. 5, 1916.
6 SHEETS—SHEET 5.

WITNESS
J. H. Swan

INVENTOR
HOMER F. HUTTON
BY James A. Walsh
ATTORNEY

H. F. HUTTON.
GRAIN SAVER FOR THRESHING MACHINES.
APPLICATION FILED APR. 3, 1916.
1,197,293.
Patented Sept. 5, 1916.
6 SHEETS—SHEET 6.
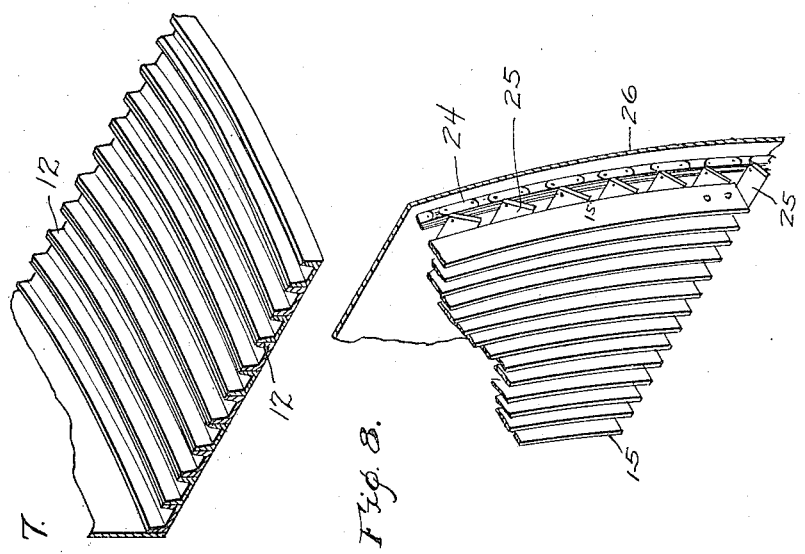
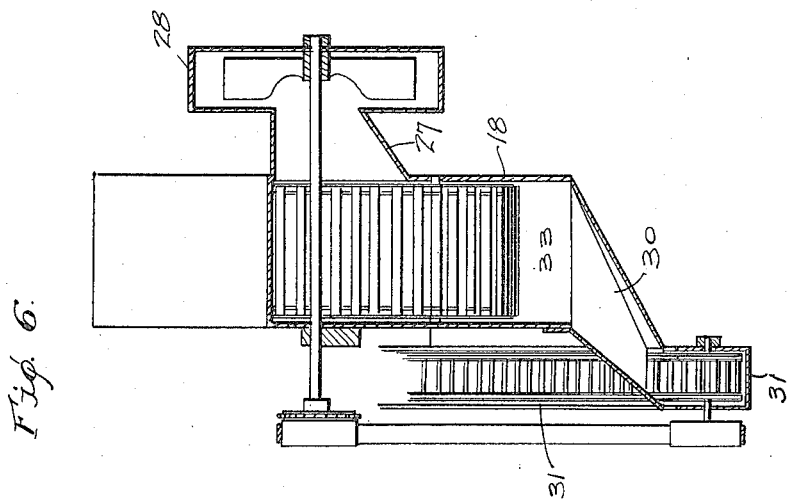
WITNESS
INVENTOR
HOMER F. HUTTON
BY James A. Walsh
ATTORNEY

UNITED STATES PATENT OFFICE.

HOMER F. HUTTON, OF JEFFERS, MONTANA.

GRAIN-SAVER FOR THRESHING-MACHINES.

1,197,293.  Specification of Letters Patent.  Patented Sept. 5, 1916.

Application filed April 3, 1916. Serial No. 88,603.

*To all whom it may concern:*

Be it known that I, HOMER F. HUTTON, a citizen of the United States, residing at Jeffers, in the county of Madison and State of Montana, have invented certain new and useful Improvements in Grain-Savers for Threshing-Machines, of which the following is a specification.

My present invention relates to improvements in threshing machines, and particularly to the pneumatic stacker which commonly forms a part thereof, which in addition to its function of discharging straw, chaff, dust, etc., I have so arranged as to be capable of capturing and saving the loose and unthreshed grain which is delivered into the fan drum with other material and forced therefrom by the blast and centrifugal action of the fan, said improvement being readily applied to the usual form of threshing machines or to modified forms thereof.

The principal object of the present invention is the provision of means which will insure the separation of the grain from the straw and chaff while in the fan drum, the grain precipitated at the bottom thereof being moved therefrom and delivered through an auxiliary separating chamber where the residual chaff is further removed and separated from the grain; and also the provision of mechanism which will economically handle the straw before it leaves the pneumatic stacker, and which will secure the maximum amount of grain usually carried away from the threshing machine with such straw to the stack to become wasted.

Figure 1:
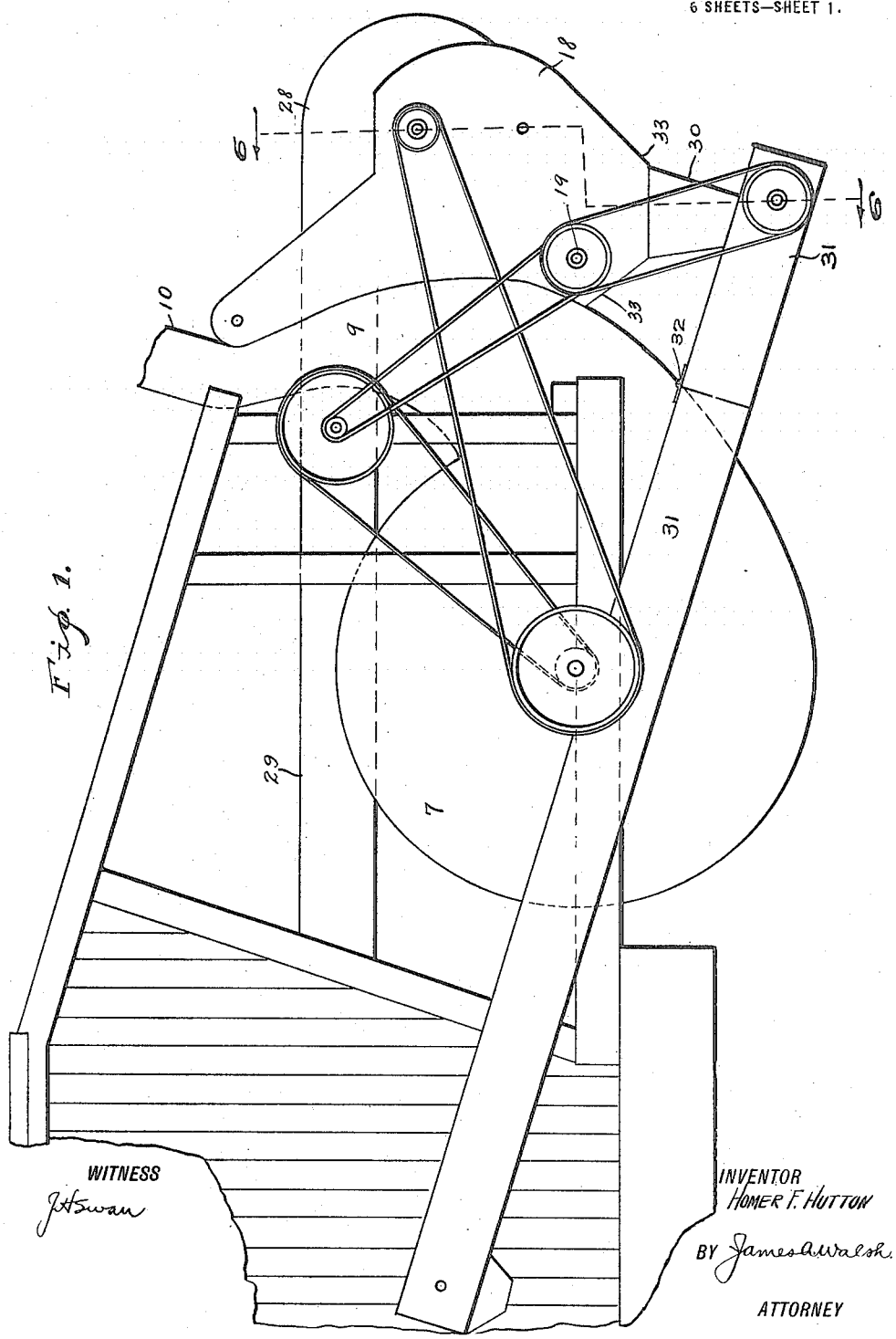
Figure 2:
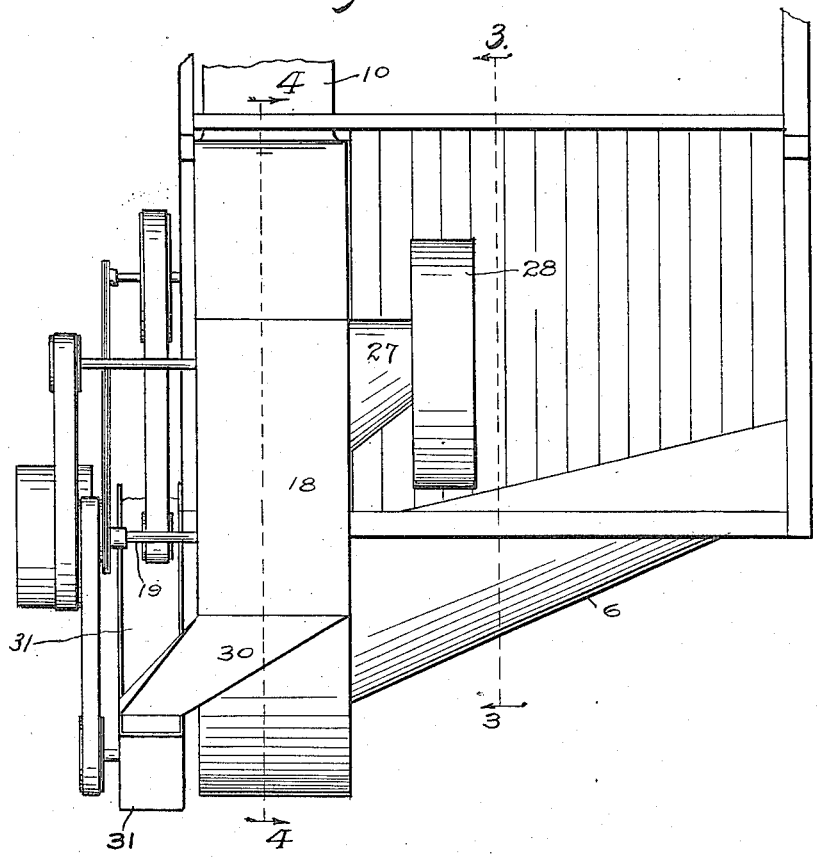
Figure 3:
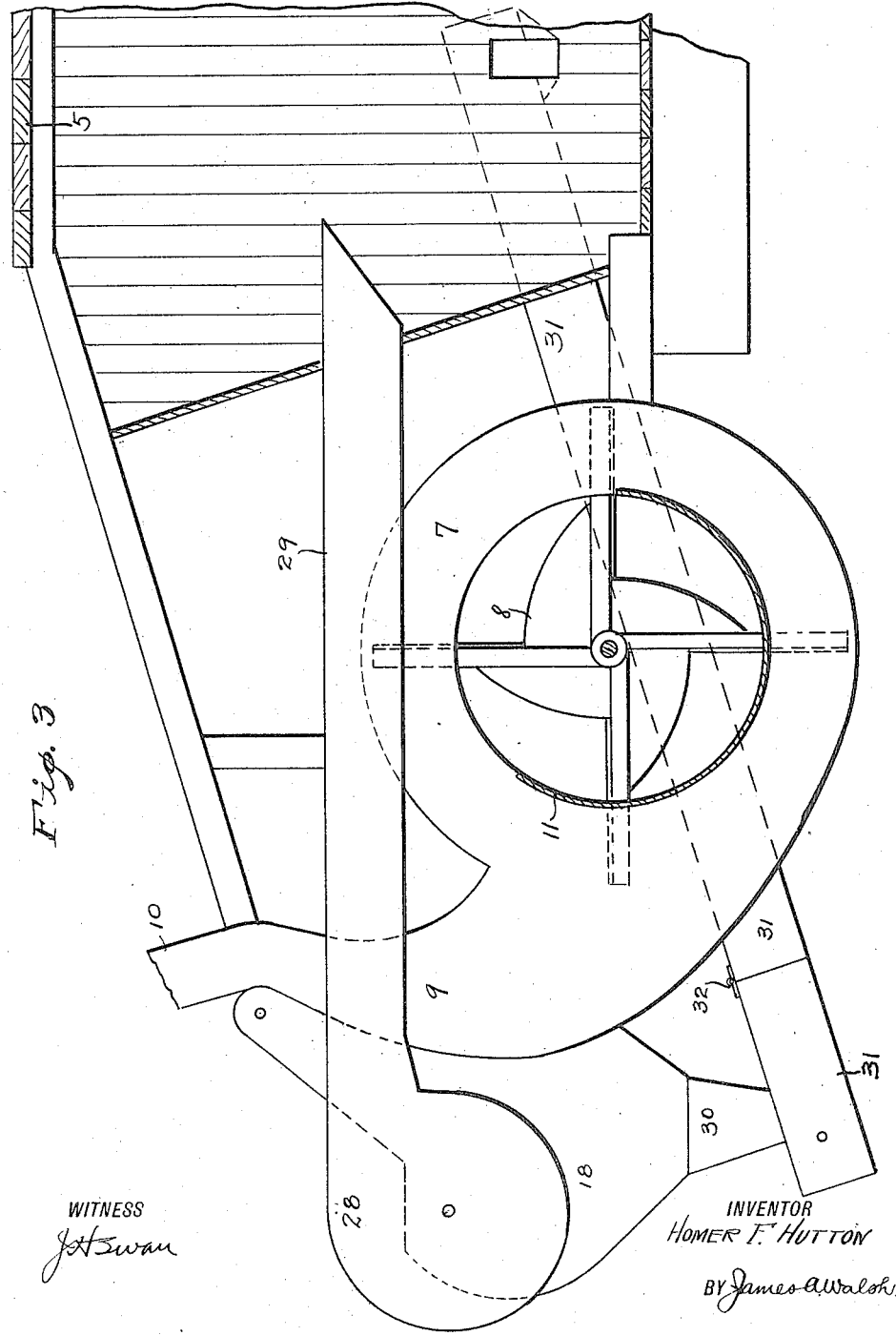
Figure 4:
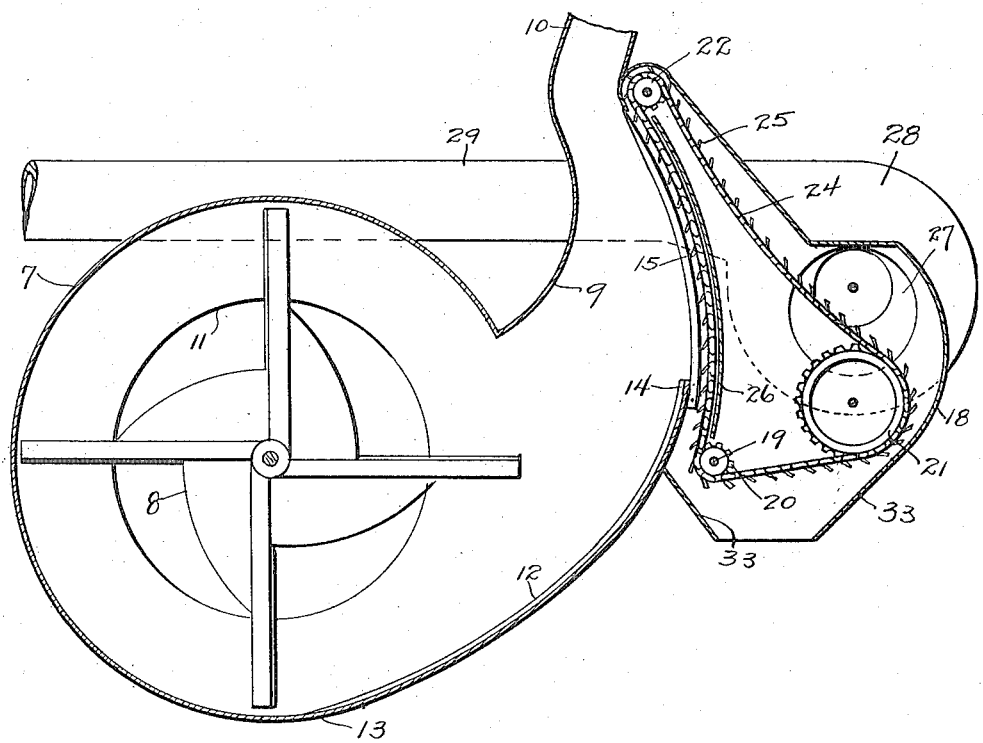
Figure 5:
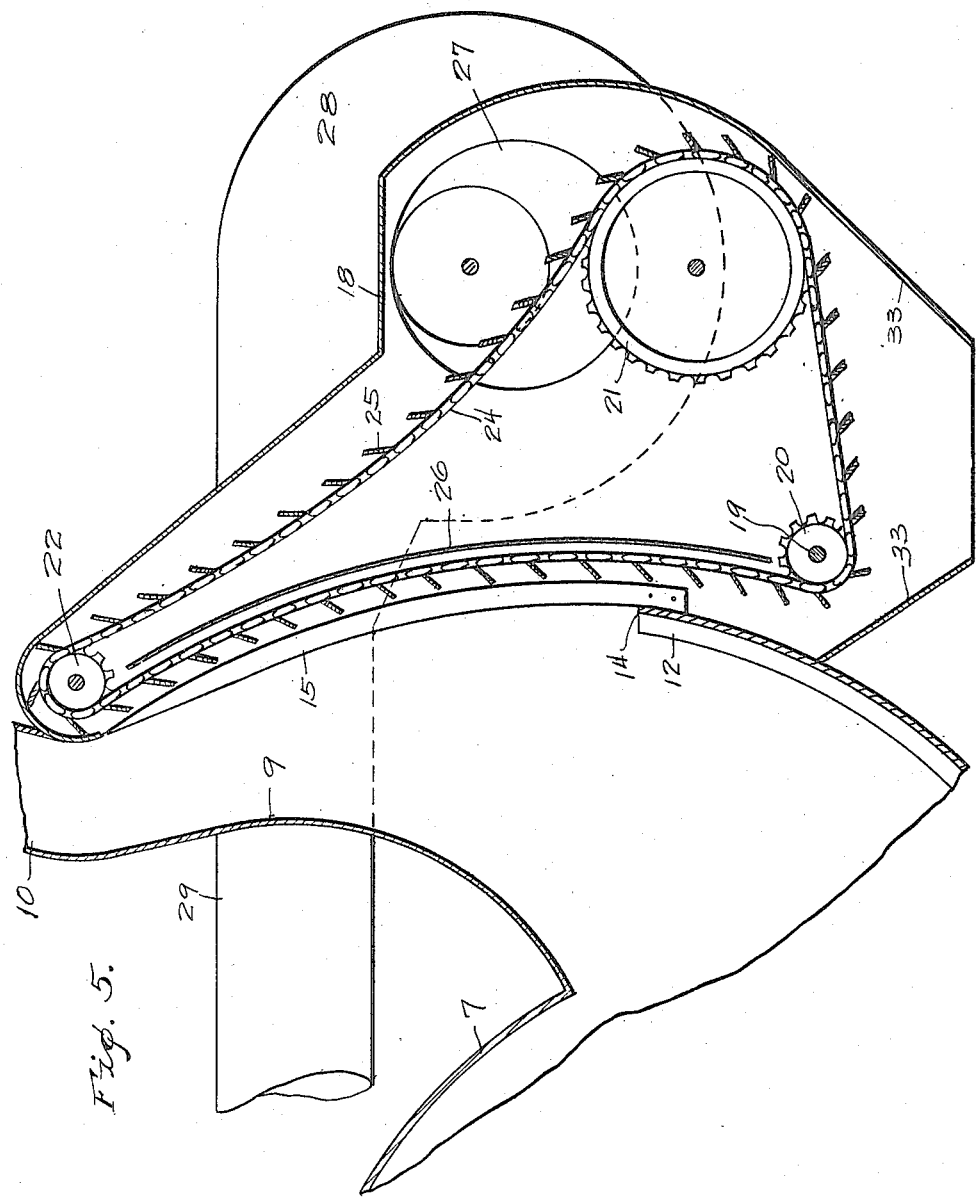

In the accompanying drawings, forming part hereof, Figure 1 is a side elevation of the rear end of a threshing machine with my invention applied thereto; Fig. 2 is a rear end elevation; Figs. 3 and 4 are detail sectional views taken on the dotted lines 3—3 and 4—4, respectively, in Fig. 2; Fig. 5 is an enlarged detail showing my improved conveyer; Fig. 6 is a rear elevation similar to Fig. 2 but with a portion of the casing removed, and Figs. 7 and 8 are perspective views, respectively, of the channel and separating bars forming part of my improvement.

Referring to the drawings, 5 indicates a threshing machine body to which is attached a pneumatic stacker comprising in general, as usual, the hopper, 6, fan drum, 7, fan, 8, a fan outlet, 9, and ejecting chute, 10, the fan drum having an inlet opening, 11, of any approved form.

The stacker may be of any suitable form, but for my purposes I prefer to curve the outlet 9 of the chute substantially as indicated in Fig. 1, gradually constricting the same to the point of connection with the chute 10, so that ample space will be provided for the straw masses immediately upon leaving the fan wings.

In the lower portion of the fan drum 7, I provide a series of channels comprising channel bars, 12, or they may be made from sheet metal and inserted therein, or the material forming the fan bottom may be similarly channeled, which channels extend from about the middle of said bottom wall, as at 13, to 14 in the outlet, where they communicate with a series of spaced grate bars, 15, the lower ends of which are secured adjacent the channels 12, and the upper ends of which are preferably tapered and terminate a considerable distance above said channels as indicated in Fig. 4. Behind said bars 15 I provide a separating casing, 18, in which I mount on shaft, 19, a driving sprocket, 20, and also on suitable shafts are mounted idlers, 21, 22. About said sprockets and idlers is mounted an endless conveyer preferably comprising sprocket chains, 24, connecting cross slats, 25, as indicated in Fig. 8, and adapted to travel in a direction reversely to the rotation of the stacker fan 8, in other words, where it passes behind the grating 15, a wall, 26, being positioned behind the grating at this point for a purpose which will hereinafter appear. At one side of said casing 18 is a throat or outlet, 27, which communicates with an exhaust fan, 28, said fan having a discharge duct, 29, leading therefrom to the straw rack of the threshing machine or otherwise as may be desired. At the lower side of said casing 18 a grain chute, 30, is provided which leads to an inclosed carrier, 31, running up alongside the threshing machine 5 for returning material thereinto, said carrier being preferably hinged, at 32, so that its lower end may be swung free from the ground to avoid danger of breakage when the machine is traveling.

In operation, the straw, chaff, and loose and unthreshed heads of grain discharge from the threshing machine into the stacker hopper 6, from which it is drawn into the drum 7 by the action of the stacker fan, and carried around by the fan wings and blast produced thereby and ejected through the boot or outlet of the fan and thence through the chute 10. During this process the fan wings thresh the grain which is delivered from the threshing machine in unthreshed condition, which, together with the loose grains mixed with other material, is by centrifugal action of the fan and the blast therefrom carried around the bottom of the drum and along into the channels 12, between which it is confined and prevented from flying out, and is carried on upwardly through them to the series of grates 15 through which, together with chaff and fine material, such grain is by the blast forced through the grating into the downwardly traveling conveyer 24—25. This conveyer, comprising spaced slats 25, is connected to sprocket chains 24, as stated, and is backed by the wall 26 which prevents the air blast and the material from entering the separating casing 18 at that point, and instead the blast follows its natural course upwardly through the chute and the material is carried downwardly by the conveyer, so that the grains by gravity fall into the hopper, 33, and thence into the chute 30, by which latter it is delivered into the conveyer 31 and carried by it back into the threshing machine to be recleaned and saved. A considerable amount of chaff and fine particles is also carried downwardly with the grain by the conveyer, but being of a light and fluffy character it is readily separated from the grain by the action of the exhaust fan 28 which draws this light material from about the casing into itself through the throat 27 and discharges the same back into the threshing machine through the duct 29.

As will be readily understood by reference to Fig. 1, the rotary elements associated with the separating casing 28 are driven from the stacker fan by a system of pulleys, sprockets and belts communicating therewith, but as any suitably arranged devices may be employed for actuating the separating and conveying mechanisms specific reference to those indicated will not herein be made.

By this arrangement I have produced a comparatively simple device for separating grain from straw, chaff and the like after it has gone through the stacker fan, and which has heretofore been delivered onto the straw stack and wasted, and by employing the exhaust fan the greater amount of chaff and fine particles is separated from the grain, which latter is returned to the threshing machine in comparatively clean condition.

I claim as my invention:

1. A grain saver for threshing machines, having a main fan casing for receiving straw to be stacked, a fan therein, a material receiving and conveying receptacle communicating with said casing, an auxiliary casing communicating with said fan casing for receiving grain separated from such straw, means between said fan and said casing through which grain is precipitated, and movable means coöperating therewith and inclosed by said auxiliary casing for conveying such grain thereinto.

2. A grain saver for threshing machines, having a main fan casing for receiving straw to be stacked, a fan in said casing, a material receiving and conveying receptacle communicating with said casing, a casing communicating with said fan casing for receiving grain separated from such straw, means between said fan and said casing through which such grain is precipitated, a conveyer traveling thereabout and inclosed by said casing for conveying such grain into said casing, and means communicating with said casing for separating chaff and fine particles from such grain and discharging the same separately therefrom.

3. A grain saver for threshing machines, having a main fan casing for receiving straw to be stacked said casing having means therein for confining loose grain, a material receiving and conveying receptacle communicating with said casing, a fan in said casing for discharging straw and driving grain through said confining means, a series of spaced bars above said confining means through which grain is precipitated, a separating casing communicating with said fan casing, and a movable conveyer inclosed by said casing for receiving and directing said grain into said casing.

4. A grain saver for threshing machines having a main fan casing for receiving straw to be stacked, a fan in said casing, a material receiving and conveying receptacle communicating with said casing, a separating casing communicating with the outlet of said fan into which grain and other material are discharged, a wall between said outlet and said casing, and means movable about said wall and inclosed by said casing for receiving and conveying such grain and other material into said casing.

5. A grain saver for threshing machines having a main fan casing for receiving straw to be stacked, a fan therein, a material receiving and conveying receptacle communicating with said casing, means in said casing for confining grain carried around by said fan, an outlet for said casing having means therein through which grain is forced by the action of said fan, a casing communicating with said outlet, a conveyer inclosed by said casing for receiving and conveying grain thereinto, an exhaust fan communicating with said casing for separating material from such grain, and a discharge duct leading from said fan to a point of discharge.

6. In a grain saver for threshing machines, the combination of a fan casing, a fan therein, a material receiving and conveying receptacle communicating with said casing, a separator casing communicating with said fan casing, a conveyer between said casings and inclosed by said separator casing for conveying grain received from said fan into said separator casing, and means communicating with said casing for separating other material from such grain.

7. In a grain saver for threshing machines, the combination of a fan casing, a fan therein, a material receiving and conveying receptacle communicating therewith, a separating casing communicating with said fan casing, a conveyer inclosed by said separator casing for receiving and conveying grain discharged from said fan, a chute communicating with said casing, and a conveyer communicating with said chute for carrying grain therefrom and delivering the same into the threshing machine.

8. In a grain saver for threshing machines, the combination, with a receiving and conveying receptacle into which material is delivered from said machine, a fan casing embodying a channeled wall for confining grain communicating with said receptacle, a fan in said casing for withdrawing material from said receptacle and ejecting the same from said casing, a grating through which grain separated by the blast and centrifugal action of said fan is precipitated, a conveyer adjacent said grating for receiving such grain, a casing into which such grain is delivered and in which said conveyer is inclosed, and means for actuating said conveyer in a direction opposite to that of the rotation of the fan wings to direct the grain downwardly into said casing.

9. In a grain saver for threshing machines having a main fan casing for receiving straw to be stacked, a series of channels in the wall of said casing for confining grain in its passage therethrough, a series of spaced bars above said channels through which said grain after leaving said channels is forced by the blast and centrifugal action of the stacker fan, a conveyer for receiving and conveying such material, and a casing inclosing said conveyer for receiving and conveying the material passing through said bars.

In testimony whereof I affix my signature in presence of two witnesses.

HOMER F. HUTTON.

Witnesses:
W. S. HARTMAN,
ANTOINETTE MCINTOSH.

Copies of this patent may be obtained for five cents each, by addressing the "Commissioner of Patents, Washington, D. C."